(12) United States Patent
Peng et al.

(10) Patent No.: US 11,169,356 B2
(45) Date of Patent: Nov. 9, 2021

(54) LENS ADJUSTMENT DEVICE

(71) Applicant: WISTRON NEWEB CORPORATION, Hsinchu (TW)

(72) Inventors: Chui-Sung Peng, Hsinchu (TW); Pai-Chen Sun, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 273 days.

(21) Appl. No.: 16/661,090

(22) Filed: Oct. 23, 2019

(65) Prior Publication Data

US 2020/0241234 A1 Jul. 30, 2020

(30) Foreign Application Priority Data

Jan. 29, 2019 (TW) ................................ 108103228

(51) Int. Cl.
*G02B 7/02* (2021.01)
*G02B 5/18* (2006.01)
*G03B 17/12* (2021.01)

(52) U.S. Cl.
CPC ........... *G02B 7/023* (2013.01); *G02B 5/1861* (2013.01); *G02B 7/022* (2013.01); *G02B 2207/123* (2013.01); *G03B 17/12* (2013.01)

(58) Field of Classification Search
CPC ...... G02B 7/023; G02B 5/1861; G02B 7/022; G02B 2207/123; G02B 27/0018; G02B 26/023; G03B 17/12; G03B 11/045

USPC ........................................................ 359/822
See application file for complete search history.

(56) References Cited

U.S. PATENT DOCUMENTS

2013/0063938 A1 3/2013 Ma et al.
2015/0288860 A1* 10/2015 Chu ..................... G03B 17/565
348/143

FOREIGN PATENT DOCUMENTS

| CN | 206002747 U | 3/2017 |
| TW | 201312248 A1 | 3/2013 |
| TW | M476943 U | 4/2014 |
| TW | M565862 U | 8/2018 |

* cited by examiner

*Primary Examiner* — James C. Jones
(74) *Attorney, Agent, or Firm* — McClure, Qualey & Rodack, LLP

(57) ABSTRACT

A lens adjustment device includes a base assembly, a lens assembly, a light blocking member and an elastic member. The lens assembly is disposed on the base assembly and is rotatable relative to the base assembly along an axis. The light blocking member is disposed between the base assembly and the lens assembly. The light blocking member is rotatable relative to the lens assembly and the base assembly. The light blocking member is movable along the axis between a first predetermined position and a second predetermined position. The elastic member abuts against the light blocking member to provide an elastic force for moving the light blocking member from the second predetermined position toward the first predetermined position such that the light blocking member abuts against the base assembly.

15 Claims, 16 Drawing Sheets

LENS ADJUSTMENT DEVICE

CROSS-REFERENCE TO RELATED PATENT APPLICATION

This application claims the benefit of priority to Taiwan Patent Application No. 108103228, filed on Jan. 29, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a lens adjustment device, and more particularly to a lens adjustment device capable of adjusting an angle of a lens.

BACKGROUND OF THE DISCLOSURE

With the popularization and minimization of camera lenses, and with the rising awareness of self-protection and home security, products in connection with monitoring systems have become more diversified. However, in the process of setting up the monitoring camera, an angle for setting up the camera is limited by available space. Even though tilted images caught by the camera can be rotatingly adjusted by computer applications, the rotating angle is limited by merely 90 degrees or 180 degrees.

Moreover, lenses provided with wide viewing angles are generally used in the monitoring system. However, since the wide-angle lens is provided with large viewing angles, a halation or a ghosting can occur due to influence of light of large incident angle. Furthermore, when the monitoring lens is used at night photography or when the monitoring lens is set up to be close to the wall surface or position of objects, the halation or the ghosting can also occur due to the self-reflection or self-refraction of the an infrared light.

Therefore, an improved lens adjustment device of the present disclosure is provided to effectively solve the aforesaid problems.

SUMMARY OF THE DISCLOSURE

In response to the above-referenced technical inadequacies, the present disclosure provides a touch display device and a display device.

In one aspect, the present disclosure provides a lens adjustment device including a base assembly, a lens assembly, a light blocking member and an elastic member. The lens assembly is disposed on the base assembly. The lens assembly is rotatable relative to the base assembly along an axis. The light blocking member is disposed between the base assembly and the lens assembly. The light blocking member is rotatable relative to the lens assembly and the base assembly. The light blocking member is movable along the axis between a first predetermined position and a second predetermined position. The elastic member abuts against the light blocking member to provide an elastic force for moving the light blocking member from the second predetermined position toward the first predetermined position such that the light blocking member abuts against the base assembly.

In certain embodiments, the present disclosure provides a lens adjustment device. When the light blocking member is in the first predetermined position, the light blocking member abuts against the base assembly. When the light blocking member is in the second predetermined position, the light blocking member abuts against the lens assembly.

Therefore, by virtue of "the lens assembly is rotatable relative to the base assembly", "the light blocking member is rotatable relative to the lens assembly and the base assembly", "the light blocking member is movable relative to the base assembly between the first predetermined position and the second predetermined position" and "the elastic member abuts against the light blocking member and the lens assembly to provide an elastic force for moving the light blocking member from the second predetermined position toward the first predetermined position such that the light blocking member abuts against the base assembly" of the lens adjustment device of the present disclosure, the light can be blocked such that the halation and the ghosting issues can be prevented also the angle of the lens can be adjusted.

These and other aspects of the present disclosure will become apparent from the following description of the embodiments taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
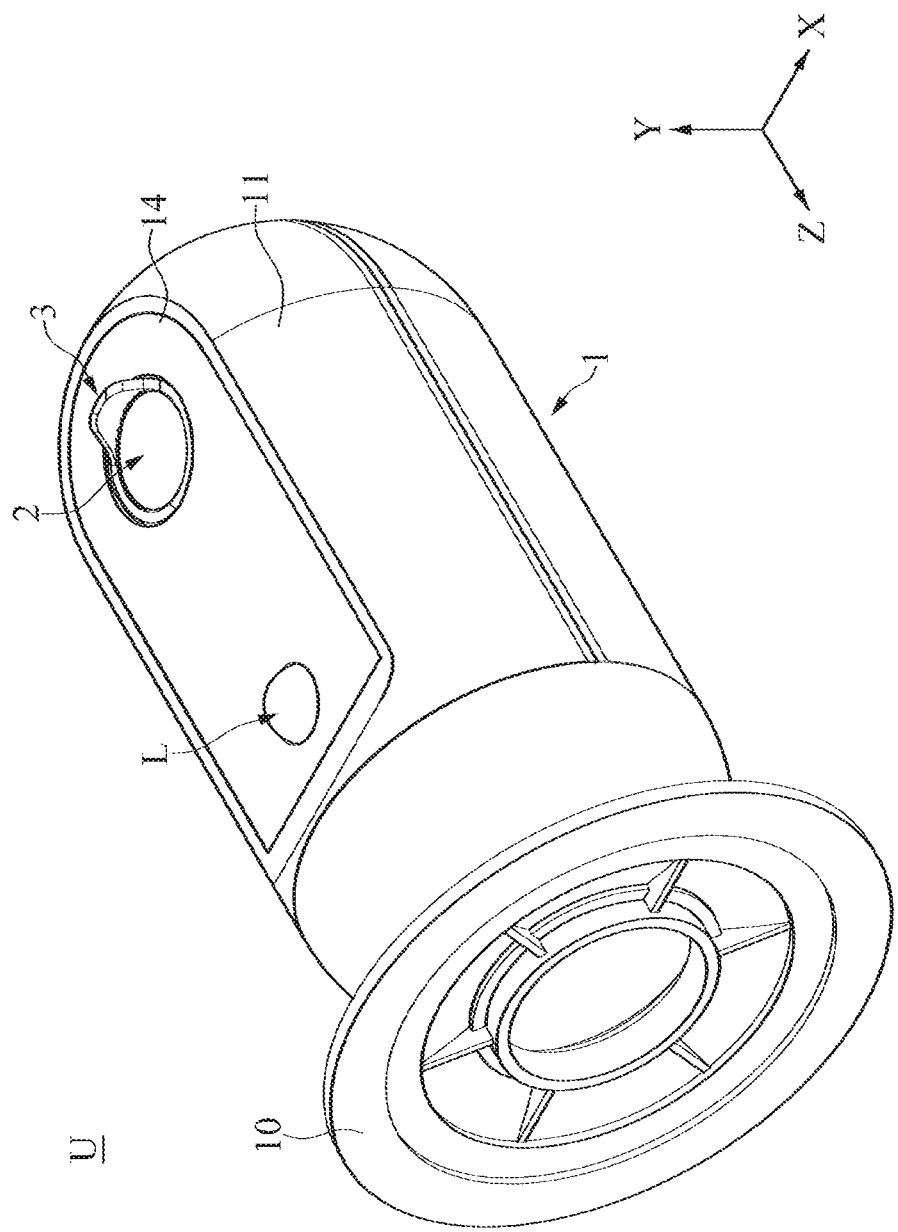
FIG. 1 is a perspective assembled schematic view of a lens adjustment device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

EMBODIMENTS

Figure 2:
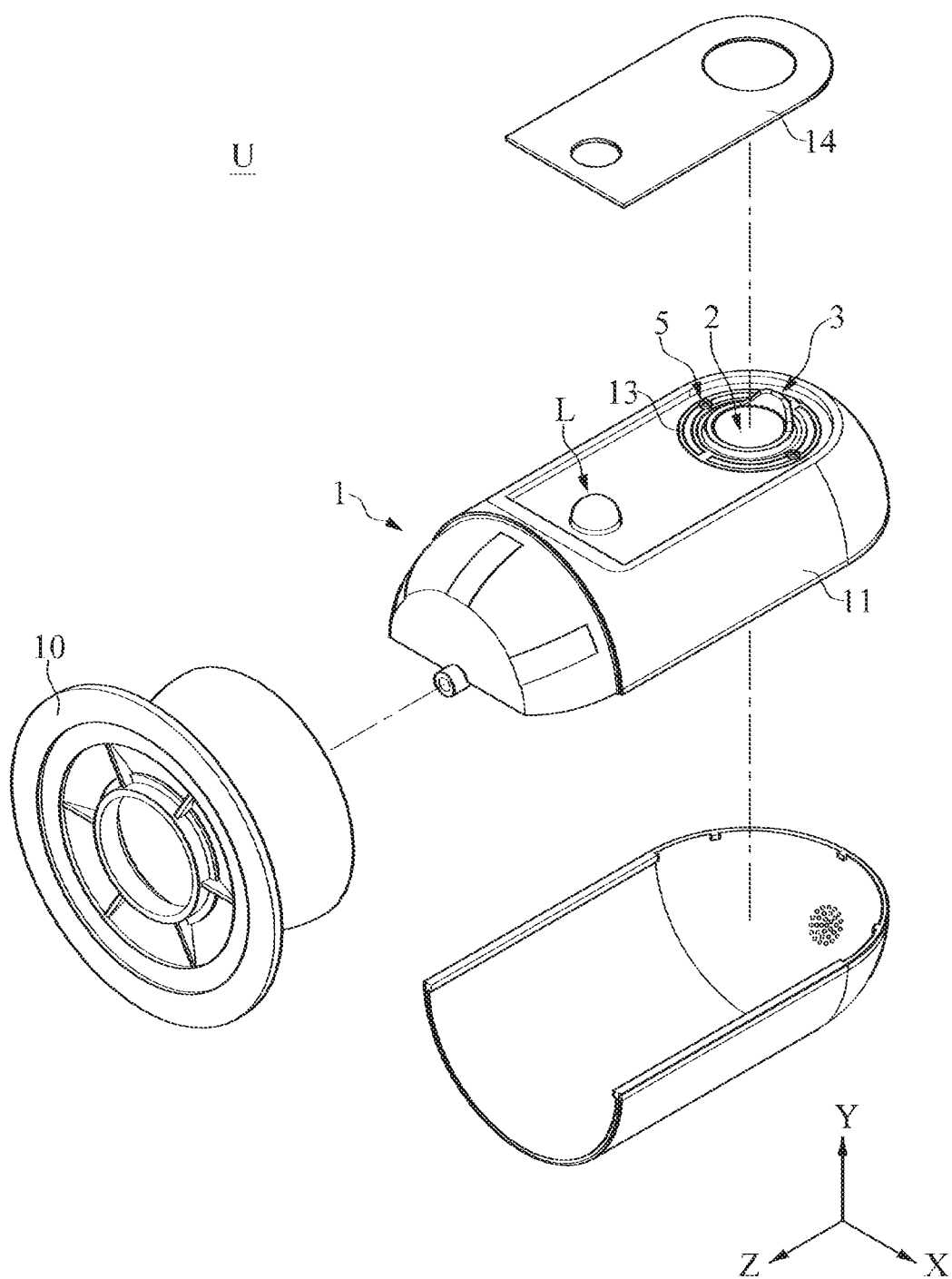
FIG. 2 is a perspective exploded view of a lens adjustment device according to an embodiment of the present disclosure.
Figure 5:
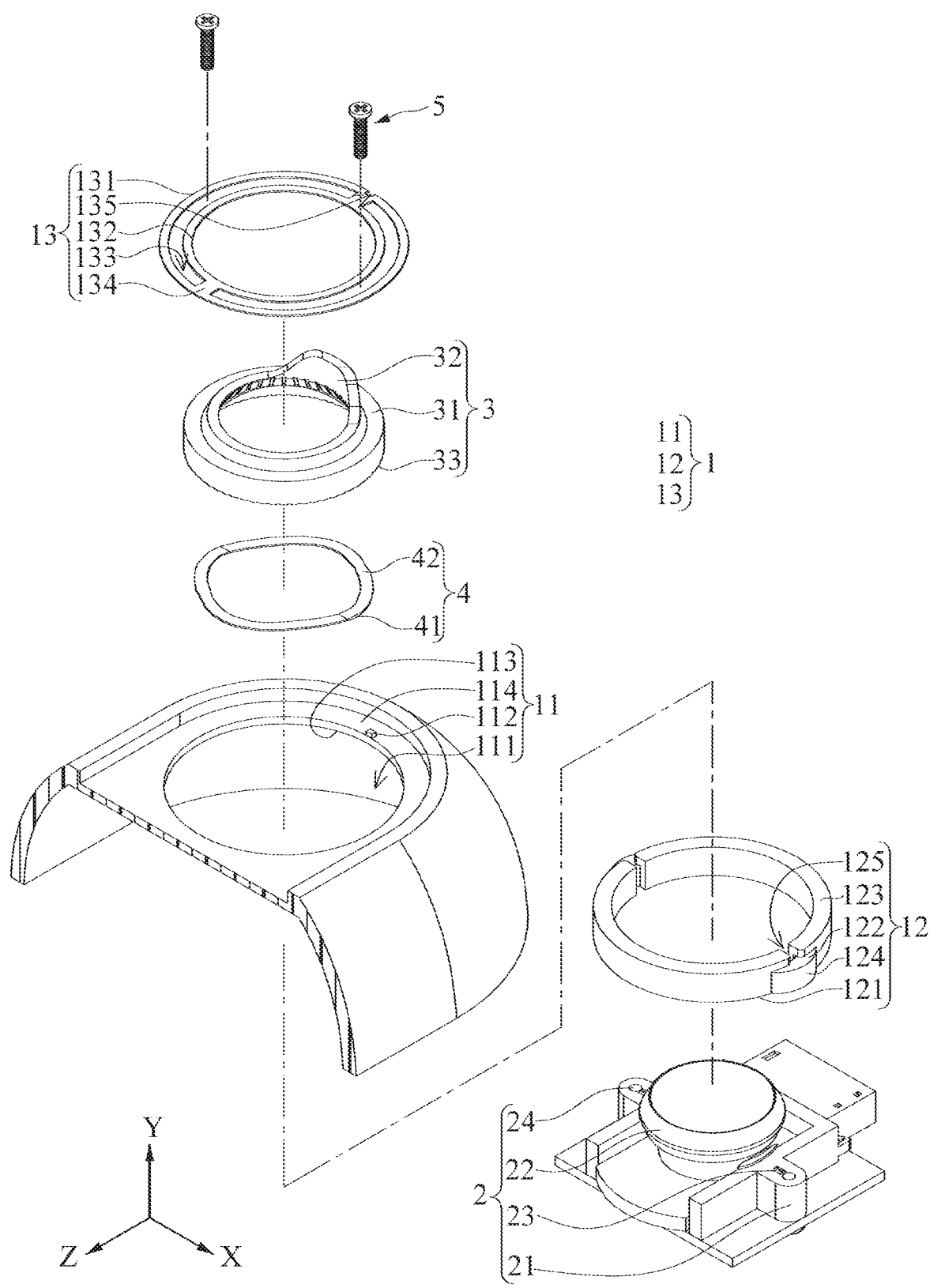
FIG. 5 is a perspective exploded view of a portion of the lens adjustment device according to the embodiment of the present disclosure.
Figure 6:
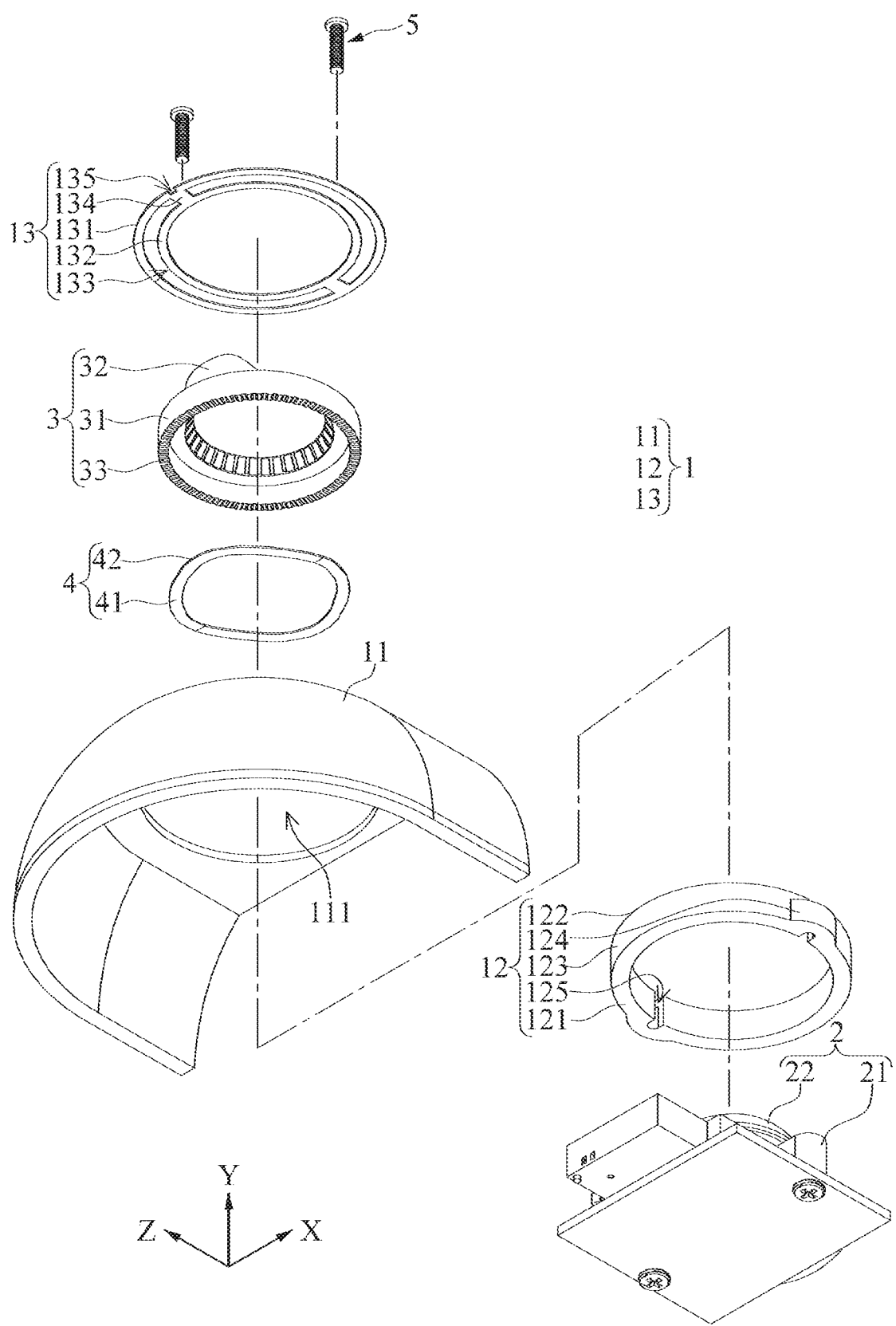
FIG. 6 is another perspective exploded view of a portion of the lens adjustment device according to the embodiment of the present disclosure.

Referring to FIG. 1 and FIG. 2, a lens adjustment device U is provided according to an embodiment of the present disclosure. The lens adjustment device U can be applied in an image monitoring system or network photography, but not limited thereto. The lens adjustment device U includes a base assembly 1, a lens assembly 2, a light blocking member 3, and an elastic member 4 (as shown in FIG. 5 and FIG. 6). The base assembly 1 includes a base body 10, a supporting frame 11 disposed on the base body 10, and a decorating plate 14 disposed on the supporting frame 11. The lens assembly 2 and the light blocking member 3 can be disposed on the supporting frame 11 of the base assembly 1. For example, the supporting frame 11 can include an upper supporting frame (not shown) and a lower supporting frame (not shown) that is correspondingly connected to the upper supporting frame. However, it should be noted that although the supporting frame 11 is formed by the upper supporting frame and the lower supporting frame, the supporting frame 11 can also be formed in other manners in other embodiments of the present disclosure, and should not be limited thereto. Furthermore, by virtue of the decorating plate 14, the exposed components of the camera lens of the device U can be adjustably blocked, thereby achieving a more aesthetic visual effect.

Figure 7:
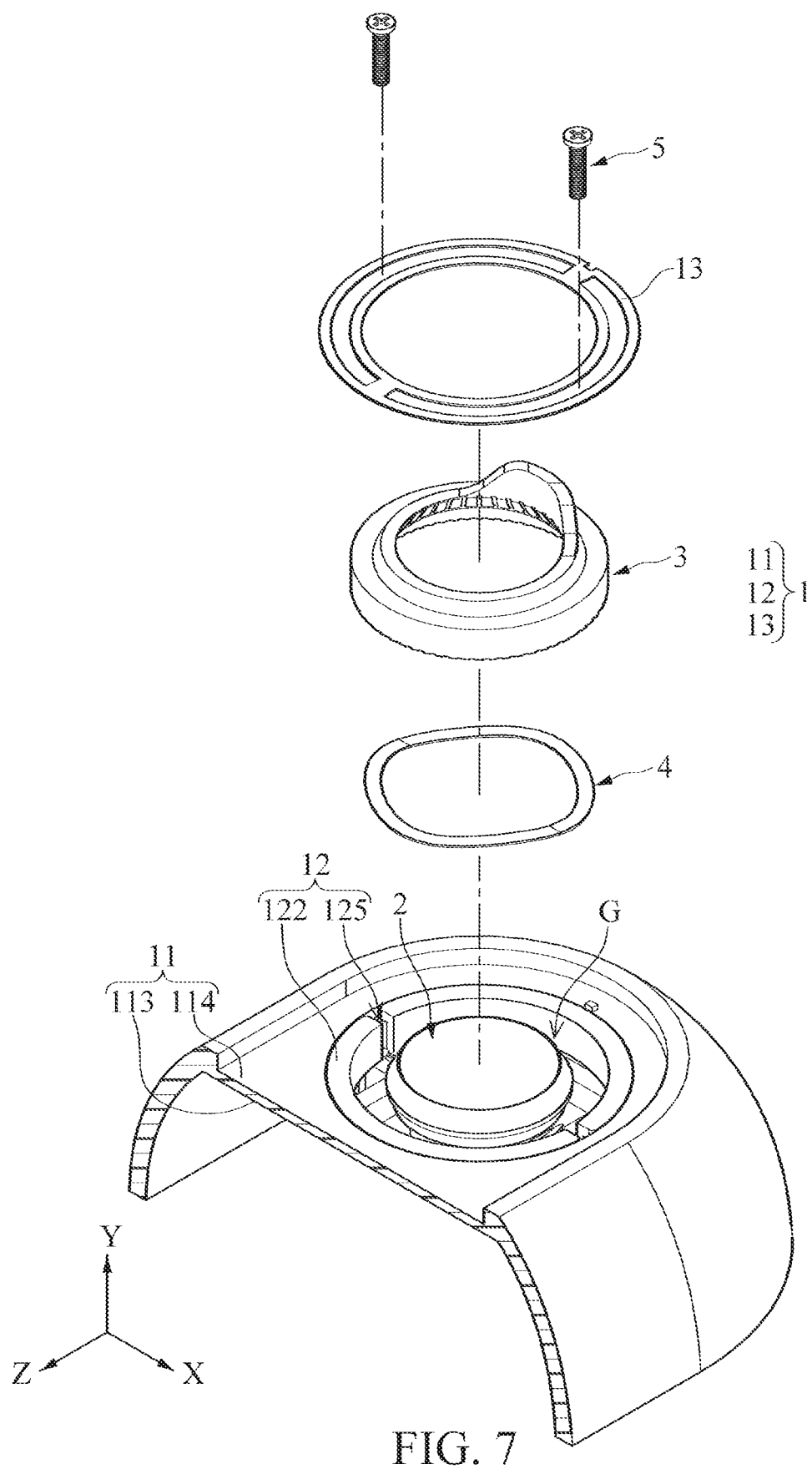
FIG. 7 is yet another perspective exploded view of a portion of the lens adjustment device according to the embodiment of the present disclosure.

Referring to FIG. 3 to FIG. 7, FIG. 3 and FIG. 4 are perspective assembled schematic views of a portion of the lens adjustment device according to the embodiments of the present disclosure. FIG. 5 to FIG. 7 are perspective exploded views of a portion of the lens adjustment device according to the embodiments of the present disclosure. In order to further demonstrate a way of combining the supporting frame 11 of the base assembly 1 with the lens assembly 2, the light blocking member 3 and the elastic member 4, FIG. 3 to FIG. 6 only show a portion of the lens adjustment device U. Specifically, the lens assembly 2 is disposed on the base assembly 1 such that the lens assembly 2 is rotatable relative to the base assembly 1 along an axis A. Moreover, the light blocking member 3 is disposed between the base assembly 1 and the lens assembly 2. The light blocking member 3 can be rotatable relative to both the lens assembly 2 and the base assembly 1, or can be rotatable relative to only the base assembly 1. The light blocking member 3 is movable between a first predetermined position and a second predetermined position. Specifically, the light blocking member 3 is movable along the axis A between the first predetermined position and the second predetermined position. Furthermore, the elastic member 4 abuts against the light blocking member 3 so as to provide an elastic force for separating the light blocking member 3 from the lens assembly 2. For example, the elastic member 4 can abut against a portion between the light blocking member 3 and the lens assembly 2, but is not limited thereto. Therefore, when the light blocking member 3 is rotatable relative to both the lens assembly 2 and the base assembly 1, the position of the light blocking member 3 can be adjusted to block the light from outside or the light and/or reflected light generated by a light emitting unit (e.g., an infrared light source) such that a halation phenomenon or a ghosting phenomenon can be prevented. Furthermore, when the light blocking member 3 and the lens assembly 2 are simultaneously rotatable relative to the base assembly 1, an image angle of the lens assembly 2 can be adjusted by adjusting the position of the lens assembly 2 relative to the base assembly 1.

Figure 11:
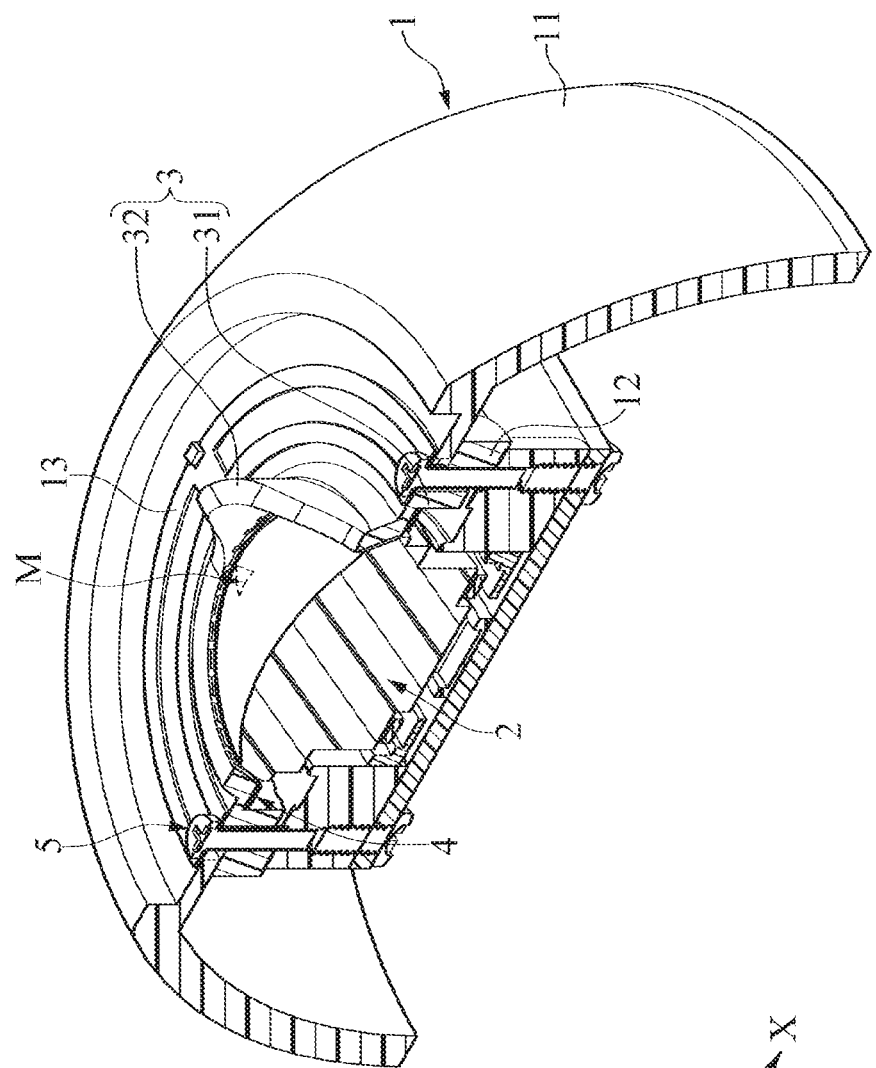
FIG. 11 is a perspective schematic view of the lens adjustment device after a light blocking member is rotated.

Referring back to FIG. 3 to FIG. 7, the supporting frame 11 can include an opening 111, a first surface 113 and a second surface 114 that corresponds to the first surface 2. The opening can communicate with the first surface 113 and the second surface 114. The lens assembly 2 and the light blocking member 3 can be disposed in the opening 111. The lens adjustment device U can further include a positioning member 5. The lens assembly 2 is disposed on the base assembly 1 via the positioning member 5. For example, the lens adjustment device U can include two positioning member 5. The positioning member 5 can be a screw member, and the lens assembly 2 is formed with a locking hole 24 corresponding to the screw member. In addition, the lens assembly 2 can include an image sensing module 21 and a lens 22 disposed on the image sensing module 21. The image sensing module 21 can include at least a lens base (not shown in figures) and a light sensing unit (not shown). The lens 22 can be disposed on the lens base of the image sensing module 21. Moreover, the light blocking member 3 includes a main body portion 31 and a light blocking portion 32 that is connected to the main body portion 31 and that protrude relative to the main body portion 31. The main body portion 31 is disposed to surround a periphery of the lens 22. The light blocking portion 32 is disposed on a side of the lens 22 and extends in a direction opposite to the lens assembly 2. In other words, since the light blocking member 3 can rotate relative to both the lens assembly 2 and the base assembly 1, a side force F can be applied onto the light blocking member 3 as shown in FIG. 2, such that the light blocking member 3 can rotate along the axis A so as to move the light blocking portion 32 of the light blocking member 3 to an appropriate position (as shown in FIG. 11). Furthermore, the light blocking portion 32 can be used to block the light projected to the lens 22 of the lens assembly 2, thereby preventing the halation phenomenon and the ghosting phenomenon.

Referring back to FIG. 3 to FIG. 7, the base assembly 1 can further include a displacement guiding plate 13 that is disposed on the loading frame 11 (e.g., an upper loading frame). The loading frame 11 is disposed between the displacement guiding plate 13 and the lens assembly 2. The displacement guiding plate 13 and the lens assembly 2 are disposed on the loading frame 11 via the positioning member 5. It should be noted that the displacement guiding plate 13 can be integrally formed as one piece with the loading frame 11, but the present disclosure is not limited thereto. Furthermore, as shown in figures, the base assembly 1 can further include a supporting frame 12 disposed between the image sensing module 21 of the lens assembly 2 and the loading frame 11. The loading frame 11 is disposed between the displacement guiding plate 13 and the supporting frame 12. The displacement guiding plate 13, the supporting frame 12 and the lens assembly 2 are disposed on the loading frame 11 via the positioning member 5. It should be noted that the base assembly 1 can include no supporting frame 12 in other embodiments of the present disclosure, and the present disclosure not limited thereto.

In addition, as shown in FIG. 7, the main body portion 31 of the light blocking member 3 can be disposed within the an accommodating groove G formed between the base assembly 1 and the lens assembly 2. The main body portion 31 is disposed between the base assembly 1 and the image sensing module 21. Moreover, the accommodating groove G can be an annular gap between the base assembly 1 and the lens assembly 2. Therefore, the annular-shaped main body portion 31 of the light blocking member 3 can be disposed in and rotatably movable within the accommodating groove G. Furthermore, the light blocking portion 32 of the light blocking member 3 can protrude outwardly from the accommodating groove G. It should be further noted that the annular gap and the annular-shaped main body portion 31 are preferably formed as circles.

Figure 8:
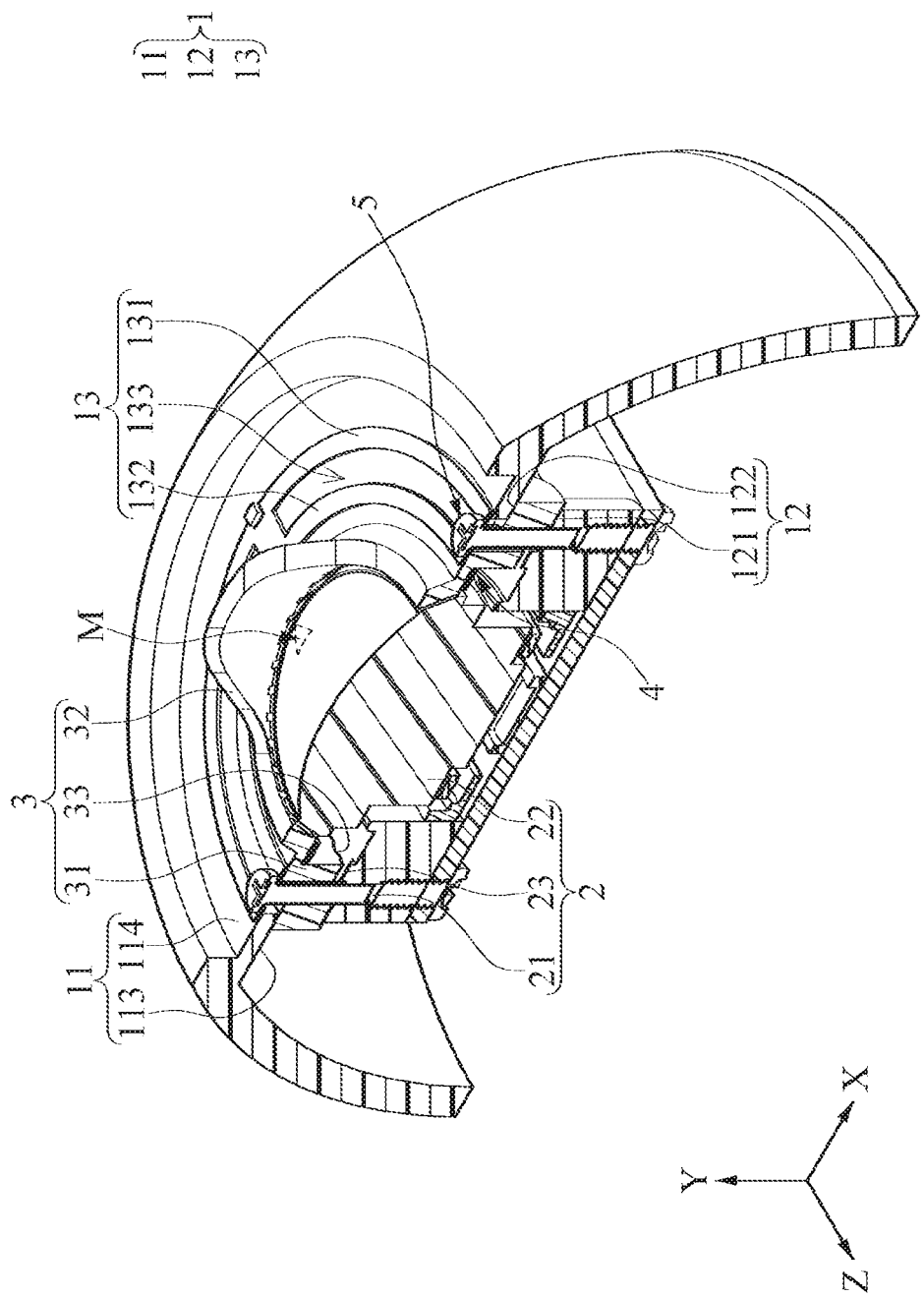
FIG. 8 is a perspective cross-sectional view taken along line IX-IX of FIG. 3.
Figure 9:
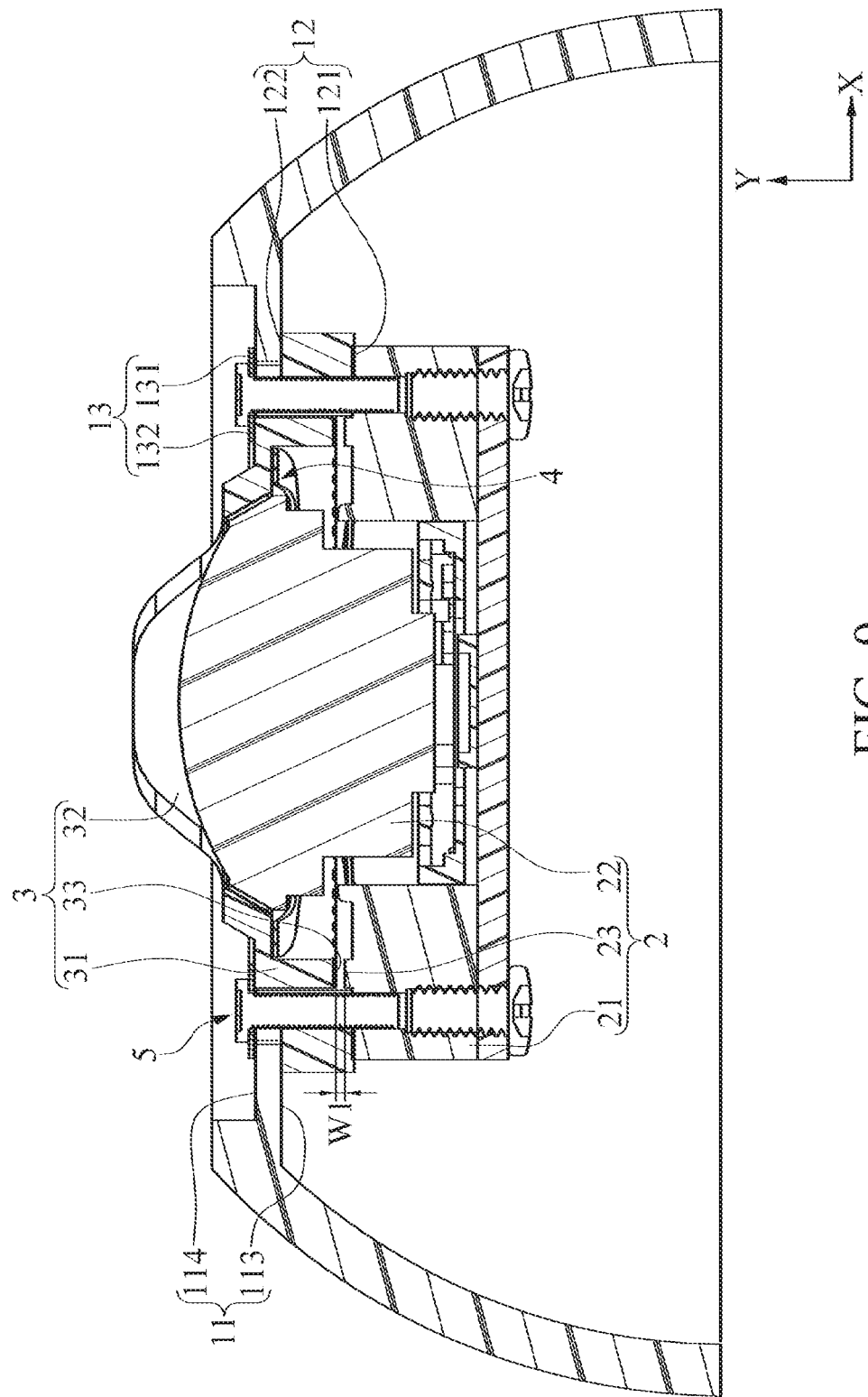
FIG. 9 is a side cross-sectional view taken along line IX-IX of FIG. 3.
Figure 10:
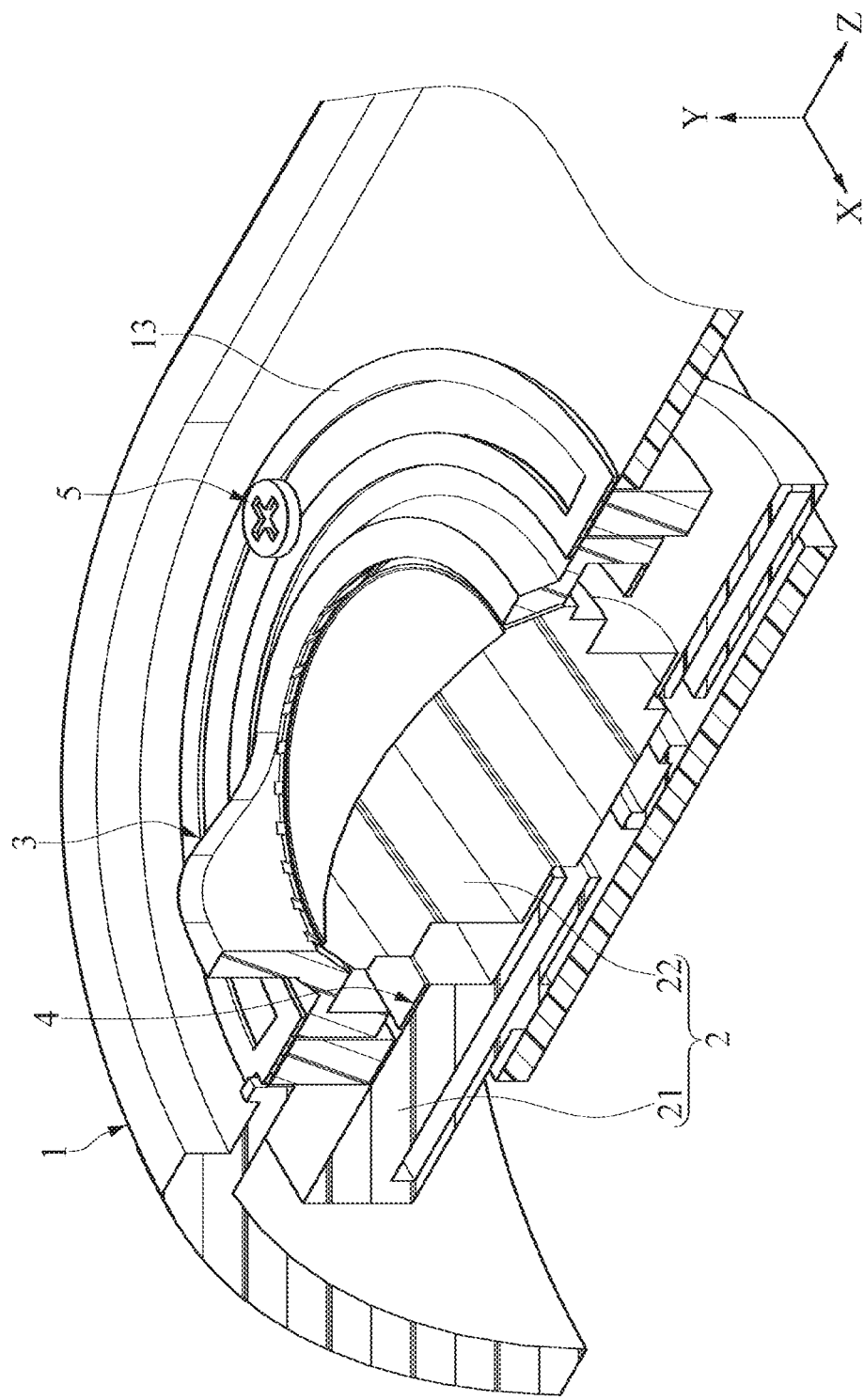
FIG. 10 is a perspective cross-sectional view taken along line X-X of FIG. 3.

Referring back again to FIG. 3 to FIG. 7 as well as FIG. 8 to FIG. 10, FIG. 8 and FIG. 9 are perspective cross-sectional views taken along line IX-IX of FIG. 3. FIG. 10 is a perspective cross-sectional view taken along line X-X of FIG. 3. Specifically, the elastic member 4 abuts against the light blocking member 3 to provide an elastic force for moving the light blocking member 3 from the second predetermined position toward the first predetermined position such that the light blocking member 3 can be separate from the lens assembly 2 and the light blocking member 3 abuts against the base assembly 1. As a result, a predetermined gap W1 can be formed between the light blocking member 3 and the lens assembly 2.

Referring back to FIG. 3 to FIG. 10, the elastic member 4 is disposed between the lens assembly 2 and the light blocking member 3. The elastic member 4 has a first end 41 that abuts against the lens assembly 2 and a second end 42 that abuts against the light blocking member 3. For example, the elastic member 4 can be a circular spring washer or a circular elastic plate as shown in FIG. 5 and FIG. 6. Moreover, the circular spring washer can be disposed with the accommodating groove G and the circular spring washer can be disposed to surround the lens 22 of the lens assembly 2. The first end 41 of the circular spring washer 4 can abut against the image sensing module 21 of the lens assembly 2, and the second end 42 of the circular spring washer 4 can abut against the main body portion 31 of the light blocking member 3. Therefore, the main body portion 31 of the light blocking member 3 can abut against the base assembly 1 via the elastic member 4. However, it is understood that although the elastic member 4 of the present disclosure is a circular spring washer in this embodiment, the elastic member 4 can be other elastic materials in other embodiments of the present disclosure, and should not be limited thereto. Moreover, since the accommodating groove G between the base assembly 1 and the lens assembly 2 is a circular gap, the circular spring washer as the elastic member 4 can effectively use the space of the accommodating groove G. Furthermore, since the elastic member 4 is bendable, FIG. 8 and FIG. 9 can merely show that the elastic member 4 abuts against the main body portion 31 of the light blocking member 3, and FIG. 10 can merely show that the elastic member 4 abuts against the image sensing module 21 of the lens assembly 2. In addition, even though the elastic member 4 in this embodiment abuts against the portion between the light blocking member 3 and the lens assembly 2, the elastic member 4 in other embodiments can also abut against the portion between the light blocking member 3 and the base assembly 1. For example, the elastic member 4 can be an elastic plate having one end that is fixed to the loading frame 11 and the other end that abuts against the light blocking member 3 (the light blocking member 3 can be formed with an opening for the other end of the elastic plate to pass through) such that an elastic force is generated to separate the light blocking member 3 from the lens assembly 2. In other words, as long as the elastic member 4 can be provided to separate the light blocking member 3 from the lens assembly 2 so as to enable the light blocking member 3 to rotate relative to both the lens assembly 2 and the base assembly 1, the present disclosure should not be limited to the aforesaid examples.

As shown in FIG. 3 to FIG. 10, the supporting frame 12 can include a third abutting portion 121 that abuts against the lens assembly 2 and a fourth abutting portion 122 that abuts against a first surface 113 of the loading frame 11. The supporting frame 12 of the present disclosure includes a main body portion 123 and an extending portion 124 that is connected to the main body portion 123. The third abutting portion 121 can be disposed on the main body portion 123 and/or the extending portion 124, and the fourth abutting portion 122 can be disposed on the extending portion 124. The supporting frame 12 can further include an opening groove 125 formed on the main body portion 123 for the positioning member 5 to pass through. Moreover, it should be noted that even though the base assembly 1 includes the supporting frame that enables the image sensing module 21 of the lens assembly 2 to indirectly abut against the first surface 113 of the loading frame 11, the lens adjustment device U can include no supporting frame 12 in other embodiments of the present disclosure. Therefore, the image sensing module 21 of the lens assembly 2 directly abuts against the first surface 113 of the loading frame 11.

Referring to FIG. 3 to FIG. 10, the displacement guiding plate 13 can include a first abutting portion 131 that abuts against a second surface 114 of the loading frame 11, a second abutting portion 132 that abuts against the light blocking member 3, and a guiding groove 133 that is formed between the first abutting portion 131 and the second abutting portion 132. The main body portion 31 of the light blocking member 3 can abut against a portion between the second abutting portion 132 of the displacement guiding plate 13 and the elastic member 4 such that the main body portion 31 of the light blocking member 3 can abut against the second abutting portion 132 of the displacement guiding plate 13 of the base assembly 1 via the elastic member 4. Furthermore, the loading frame 11 can further include a first positioning portion 112, the displacement guiding plate 13 can further include a second positioning portion 135 that corresponds to the first positioning portion 112. The first positioning portion 112 and the second positioning portion 135 is engaged with each other. Therefore, the displacement guiding plate 13 can be fixed to the loading frame 11.

Referring back again to FIG. 3 to FIG. 10, the positioning member 5 sequentially passes through the guiding groove 133 of the displacement guiding plate 13, the opening groove 125 of the supporting frame 12, and the locking hole 24 of the lens assembly 2. One end (not shown in figures) of the positioning member 5 can abut against the first abutting portion 131 and the second abutting portion 132 of the displacement guiding plate 13. Thus, the lens assembly 2 can be disposed on the loading frame 11. Moreover, since the second abutting portion 132 of the displacement guiding plate 13 abuts against the light blocking member 3, the main body portion 31 of the light blocking member 3 is disposed between the main body portion 123 of the supporting frame 12 and the lens 22, such that the light blocking member 3 can be restrained between the base assembly 1 and the lens assembly 2 on the loading frame 11.

Referring back to FIG. 3 and also referring to FIG. 11, which is a perspective schematic view of the lens adjustment device after the light blocking member 3 is rotated. When the side force F is applied onto the light blocking member 3 in the first predetermined position, the light blocking member 3 can rotate relative to the base assembly 1. In other words, when the side force F is applied onto the light blocking portion 32 of the light blocking member 3, the main body portion 31 of the light blocking member 3 is slidable on the main body portion 123 of the supporting frame 12 and is rotatable along the axis A. Consequently, when the light blocking member 3 rotates relative to the base assembly 1, the light blocking portion 32 of the light blocking member 3 can rotate along an outer periphery of the lens 22. Moreover, when the light blocking portion 32 of the light blocking member 3 is moved to an appropriate position, the light blocking portion 32 can block the light projected to the lens 22 of the lens assembly 2. Furthermore, the side force F can be a force along a direction of a tangent line of an outer periphery of the light blocking portion 32 such that the light blocking portion 32 can rotate along the outer periphery of the lens 22, but the present disclosure should not be limited thereto.

Figure 12:
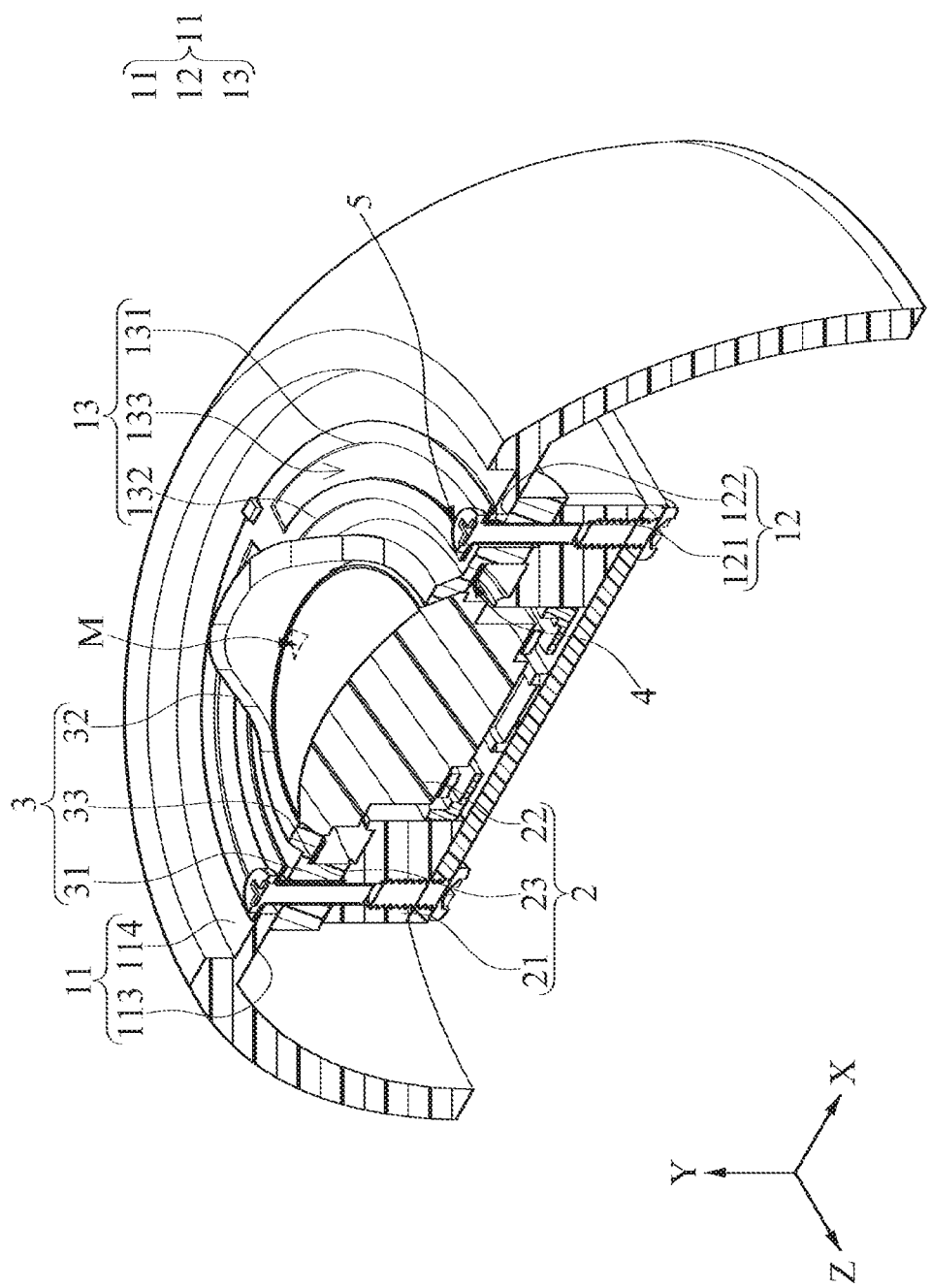
FIG. 12 is a perspective cross-sectional view of the lens adjustment device after the light blocking member in FIG. 8 is pressed down.
Figure 13:
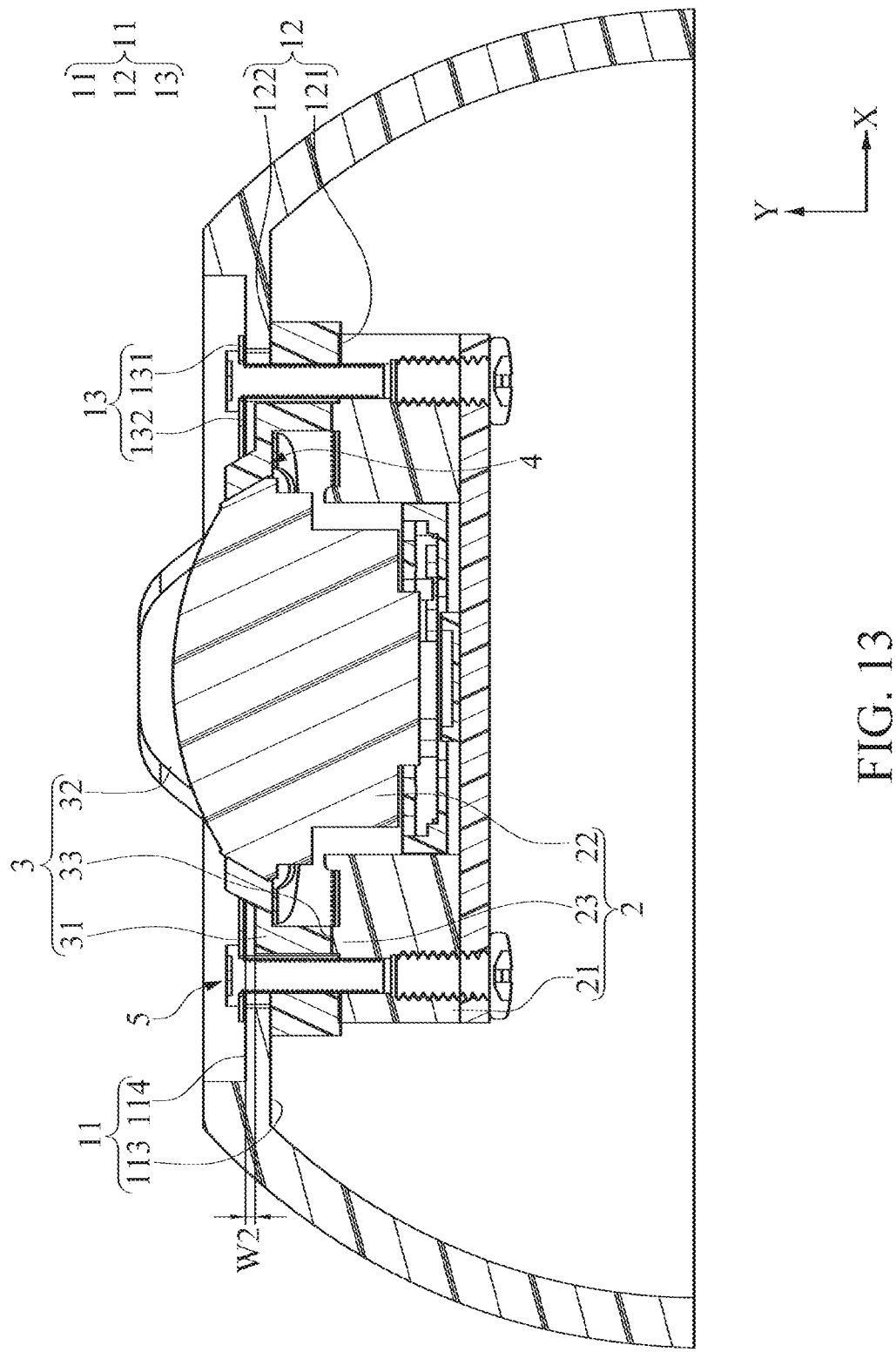
FIG. 13 is a cross-sectional view of the lens adjustment device after the light blocking member in FIG. 9 is pressed down.

Referring back to FIG. 3 to FIG. 11, and also referring to FIG. 12 and FIG. 13, FIG. 12 is a perspective cross-sectional view of the lens adjustment device after the light blocking member 3 in FIG. 8 is pressed down. FIG. 13 is a cross-sectional view of the lens adjustment device after the light blocking member 3 in FIG. 9 is pressed down. In other words, FIG. 8 and FIG. 9 show the light blocking member 3 that is in the first predetermined position. FIG. 12 and FIG. 13 show the light blocking member 3 that is in the second predetermined position. As shown in FIG. 8 and FIG. 9, when the light blocking member 3 is in the first predetermined position, the light blocking member 3 abuts against the base assembly 1 and separates from the lens assembly 2. As shown in FIG. 12 and FIG. 13, when the light blocking member 3 is in the second predetermined position, the light blocking member 3 abuts against the lens assembly 2. Therefore, a predetermined gap W2 can be formed between the light blocking member 3 and the second abutting portion 132 of the displacement guiding plate 13 of the base assembly 1.

Figure 3:
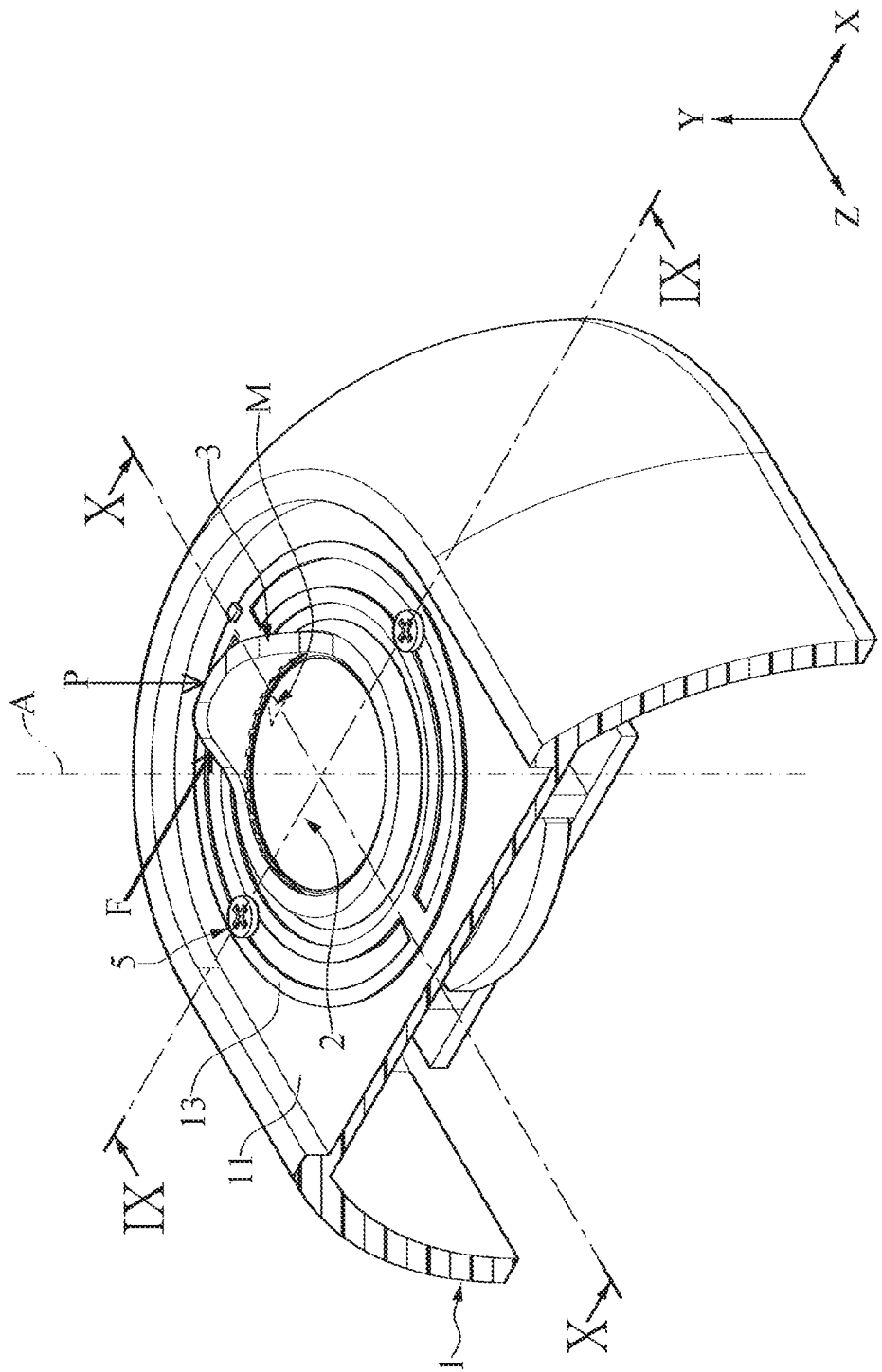
FIG. 3 is a perspective assembled schematic view of a portion of the lens adjustment device according to the embodiment of the present disclosure.
Figure 4:
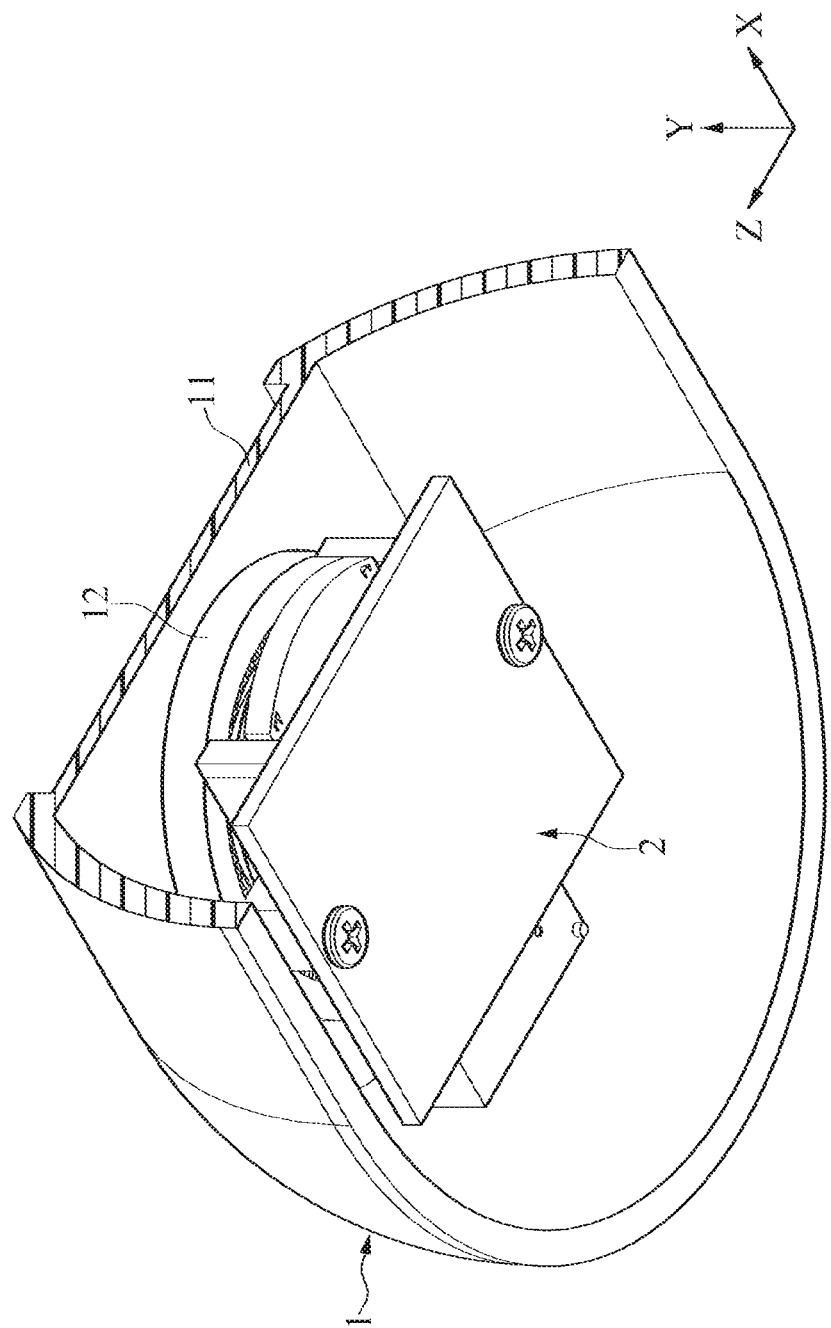
FIG. 4 is another perspective assembled schematic view of a portion of the lens adjustment device according to the embodiment of the present disclosure.

Referring to FIG. 5 to FIG. 13, when a pressure P is applied onto the light blocking member 3 in a direction toward the lens assembly 2 (e.g., a-Y direction), the light blocking member 3 can be moved, by the pressure P, from the first predetermined position to the second predetermined position so as to abut against the lens assembly 2. Therefore, by virtue of the elastic member 4 and application of the force (a pressure P for example, as shown in FIG. 3), the light blocking member 3 can be moved between the first predetermined position and the second predetermined position relative to the loading frame 11 of the base assembly 1. In other words, the light blocking member 3 is movable between the first predetermined position and the second predetermined position within the accommodating groove G relative to the base assembly 1. Moreover, the accommodating groove G can restrain the position of the light blocking member 3 relative the base assembly 1 and the lens assembly 2.

Figure 14:
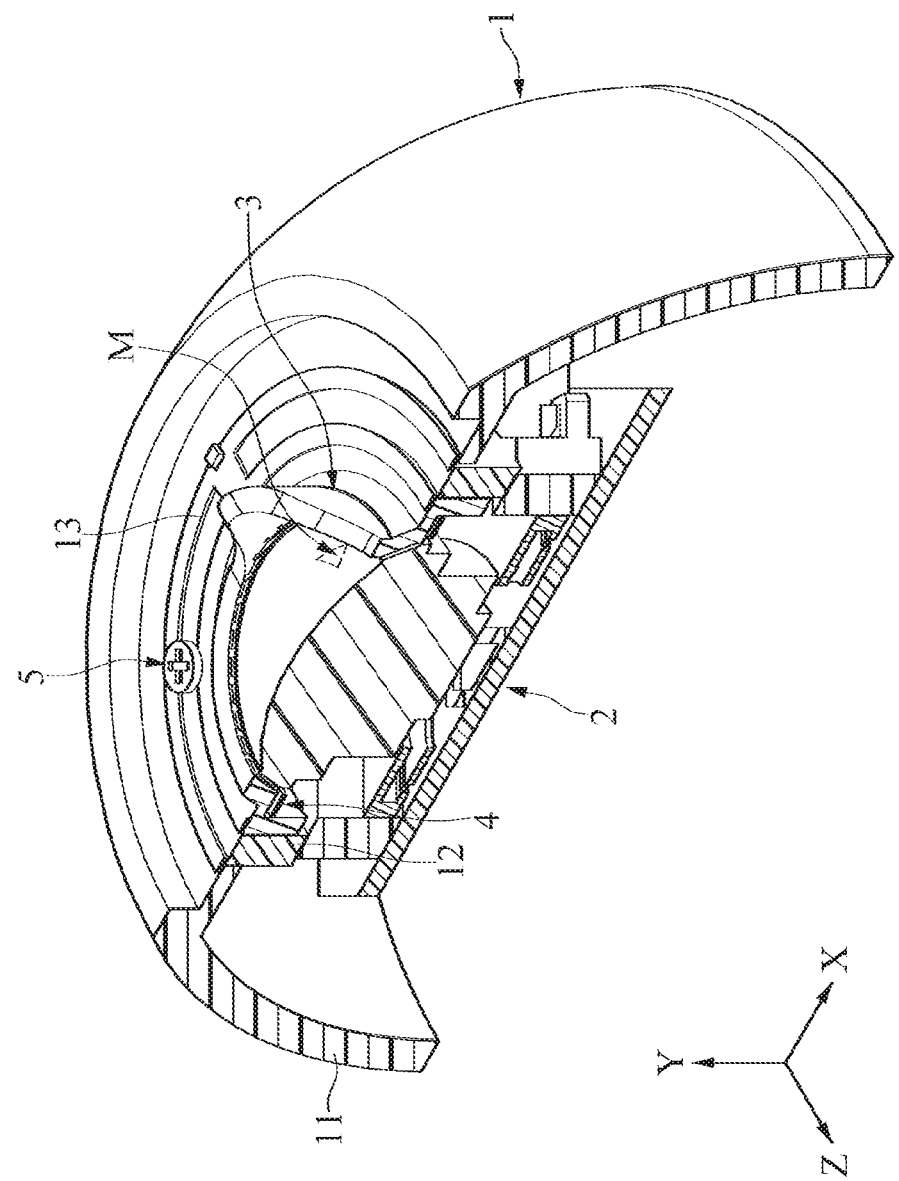
FIG. 14 is a perspective schematic view of the lens adjustment device after a lens assembly and the light blocking member are rotated.

Referring to FIG. 5 to FIG. 13, and also referring to FIG. 14, FIG. 14 is a perspective schematic view of the lens adjustment device after a lens assembly 2 and the light blocking member 3 are rotated. When a side force is applied onto the light blocking member 3 in the second predetermined position, the light blocking member 3 can use the friction force between the main body portion 31 and the lens assembly 2 to enable the lens assembly 2 to rotate relative to the base assembly 1. In other words, when the light blocking member 3 is simultaneously pressed by the pressure P in the direction toward the lens assembly 2 and the side force F, the light blocking member 3 can be moved, by the pressure P, from the first predetermined position to the second predetermined position so as to abut against the lens assembly 2. Meanwhile, the light blocking member 3 can use the pressure P and the side force F to enable the lens assembly 2 to rotate relative to the base assembly 1. In other words, as shown in FIG. 3 and FIG. 14, the light blocking member 3, the lens assembly 2, the supporting frame and the positioning member 5 can be rotatable along the axis A.

Referring back to FIG. 5 to FIG. 14, the lens assembly 2 further includes a first engaging portion 23. The light blocking member 3 further includes a second engaging portion 33 corresponding to the first engaging portion 23. When the light blocking member 3 is in the second predetermined position, the light blocking member 3 can abut against the lens assembly 2, and the first engaging portion 23 and the second engaging portion 33 are engaged with each other. For example, the first engaging portion 23 can be a hollow groove, and the second engaging portion 33 can be a protruding member that is correspondingly engaged with the hollow groove. However, the first engaging portion 23 and the second engaging portion 33 should not be limited thereto. Therefore, the lens assembly 2 can be engaged with the light blocking member 3 via the first engaging portion 23 and the second engaging portion 33. As a result, the friction between the lens assembly 2 and the light blocking member 3 can be increased, so that the lens assembly 2 does not slide easily relative to the light blocking member 3.

Referring back to FIG. 5 to FIG. 14, since the positioning member 5 is disposed on the opening groove 125 of the supporting frame 12 and is fixed to the lens assembly 2, the supporting frame 12 can rotate relative to the frame 11 and the displacement guiding plate 13 and the positioning member 5 can slide along the guiding groove 133 when the lens assembly 2 rotates relative to the base assembly 1. Moreover, in order to prevent the tangling of the cables (not shown in figures) connected to the lens assembly 2, the displacement guiding plate 13 can include a limiting portion 134 corresponding to the positioning member 5. Therefore, when the lens assembly 2 is rotated to a predetermined position relative to the base assembly 1, the positioning member 5 abuts against the limiting portion 134 so as to limit rotation of the lens assembly 2.

As a result, as shown in FIG. 5 to FIG. 14, in order to prevent the halation phenomenon or the ghosting phenomenon, a side force can be applied onto the light blocking portion 32 of the light blocking member 3 such that the light blocking portion 32 can rotate along the periphery of the lens 22. Moreover, when the process of setting up the monitoring camera and or the webcam is limited by the space, a pressure P in the direction towards the lens assembly 2 can be applied such that the light blocking member 3 can abut against the lens assembly 2. Furthermore, the side force can also be applied onto the light blocking portion 32 of the light blocking member 3. Thus, when the light blocking member 3 is rotating relative to the base assembly 1, the friction between the light blocking member 3 and the lens assembly 2 can be used to enable rotation of the lens assembly 2. In addition, it should be noted that the shape of the light blocking portion 32 can be adjustably designed based on a view angle of the lens assembly 2 so as to prevent the light from entering the lens 22 which causes the halation phenomenon or the ghosting phenomenon.

Referring back to FIG. 3, FIG. 8, FIG. 11, FIG. 12 and FIG. 14, the lens adjustment device further include an identification mark M. The identification mark M is marked on the lens assembly 2 so as to identify a position of lens assembly 2 relative to the base assembly 1. For example, the identification mark M can be a transparent nick or a mark for identifying the current position of lens assembly 2 when being rotated. It should be noted that since the positioning member 5 can rotate together with the lens assembly 2, the positioning member 5 can be regarded as the identification mark M in an embodiment of the present disclosure, and the form of the identification mark M should not be limited thereto.

Figure 15:
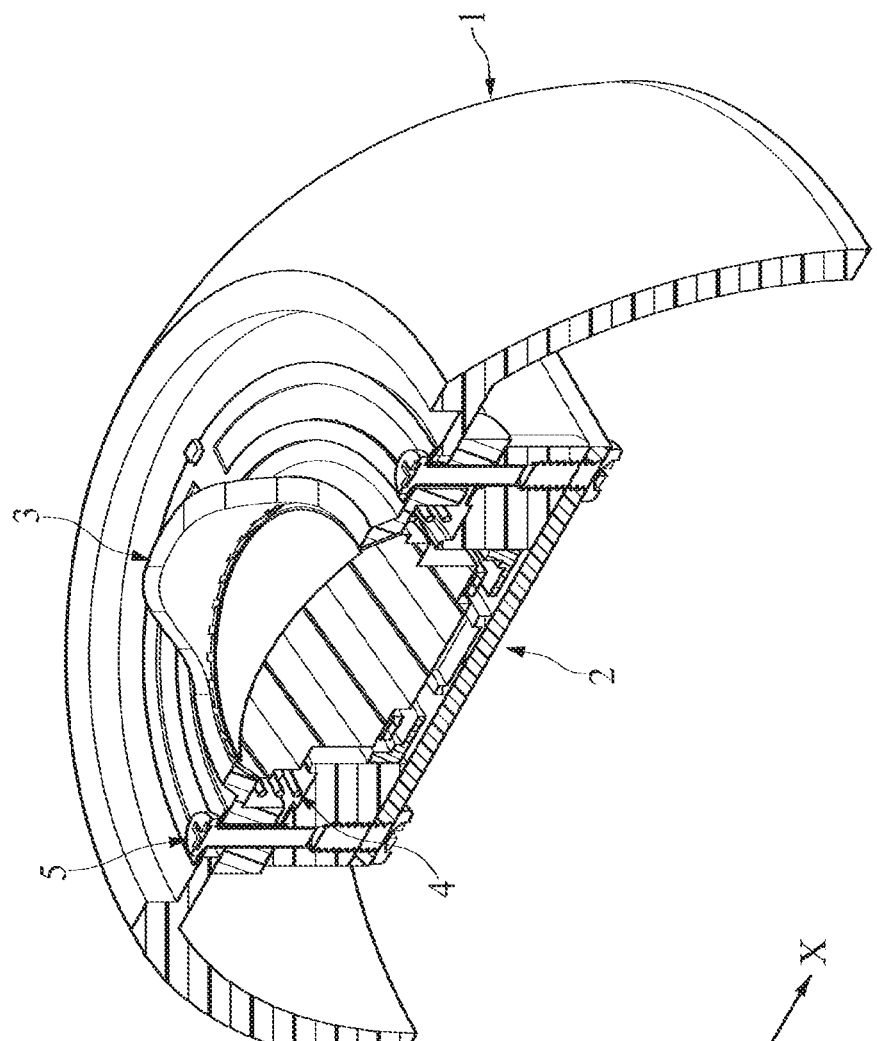
FIG. 15 is a perspective cross-sectional view of the lens adjustment device according to another embodiment of the present disclosure.

Referring to FIG. 15, FIG. 15 is a perspective cross-sectional view of the lens adjustment device according to another embodiment of the present disclosure. Compared with FIG. 15 and FIG. 8, the major difference resides in the form of the elastic member 4. Specifically, the elastic member 4 in FIG. 15 can be a compressed spring, but should not be limited thereto.

Figure 16:
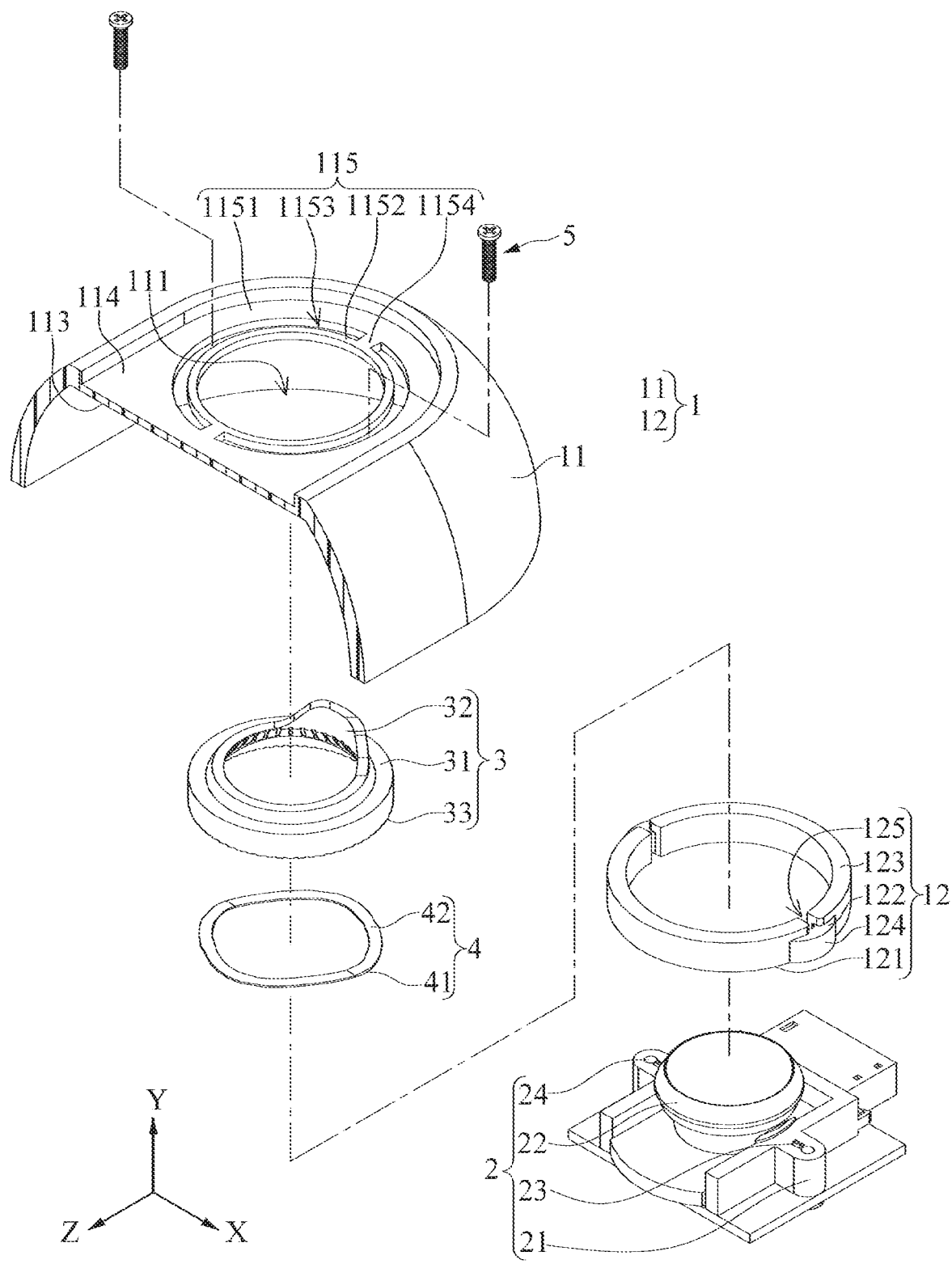
FIG. 16 is a perspective exploded view of the lens adjustment device according to another embodiment of the present disclosure.

Referring to FIG. 16, FIG. 16 is a perspective exploded view of the lens adjustment device according to another embodiment of the present disclosure. Compared with FIG. 16 and FIG. 5, in other embodiments, the displacement guiding plate 13 and the loading frame 11 can be integrally formed as one piece. In other words, in FIG. 16, the loading frame 11 of the base assembly 1 can include a displacement guiding structure 115. The displacement guiding structure 115 includes a first abutting portion 1151 and a second abutting portion 1152 that abuts against the light blocking member 3. The light blocking member 3 abuts against a portion between the second abutting portion 1152 and the elastic member 4. The displacement guiding structure 115 further includes a guiding groove 1153 formed between the first abutting portion 1151 and the second abutting portion 1152. When the lens assembly 2 rotates relative to the base assembly 1, the positioning member 5 is slidable along the guiding groove 1153. Moreover, the displacement guiding structure 115 further includes a limiting portion 1154 corresponding to the positioning member 5. When the lens assembly 2 is rotated to a predetermined position relative to the base assembly 1, the positioning member 5 abuts against the limiting portion 1154 so as to limit rotation of the lens assembly 2.

Referring to FIG. 16, the base assembly 1 can further include a supporting frame 12 disposed between the lens assembly 2 and the loading frame 11. The supporting frame 12 and the lens assembly 2 are disposed on the loading frame 11 via the positioning member 5. The supporting frame 12 includes a third abutting portion 121 that abuts against the lens assembly 2 and a fourth abutting portion 122 that abuts against the first abutting portion 1151 of the displacement guiding structure 115. However, in other embodiments, the lens adjustment device can include no supporting frame 12, and should not be limited thereto.

In conclusion, by virtue of "the lens assembly 2 can rotate relative to the base assembly 1", "the light blocking member 3 can rotate relative to the lens assembly 2 and the base assembly 1", "the light blocking member 3 can move between the first predetermined position and the second predetermined position relative to the base assembly 1", and "the elastic member 4 abuts against the light blocking member 3 to provide the elastic force for moving the light blocking member 3 from the second predetermined position toward the first predetermined position such that the light blocking member 3 abuts against the base assembly 1" according to the lens adjustment device of the present disclosure, the halation phenomenon or the ghosting phenomenon can be prevented and the angle of the lens assembly 2 can be adjusted.

Furthermore, since the angle of the lens assembly 2 can be adjusted according to the lens adjustment device U of the present disclosure, images outputted by the lens assembly 2 can be directly adjusted by the users in which no post-production adjustments by image-editing applications is needed.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A lens adjustment device comprising:
a base assembly;

a lens assembly, disposed on the base assembly, wherein the lens assembly is rotatable relative to the base assembly along an axis;

a light blocking member disposed between the base assembly and the lens assembly, wherein the light blocking member is rotatable relative to the lens assembly and the base assembly, and the light blocking member is movable along the axis between a first predetermined position and a second predetermined position; and an elastic member abutting against the light blocking member to provide an elastic force for moving the light blocking member from the second predetermined position toward the first predetermined position such that the light blocking member abuts against the base assembly.

2. The lens adjustment device according to claim 1, wherein when the light blocking member is in the first predetermined position, the light blocking member abuts against the base assembly, and wherein when the light blocking member is in the second predetermined position, the light blocking member abuts against the lens assembly.

3. The lens adjustment device according to claim 1, wherein the lens assembly includes an image sensing module and a lens disposed on the image sensing module, wherein the light blocking member includes a main body portion and a light blocking portion that is connected to the main body portion and that protrudes relative to the main body portion, wherein the main body portion is disposed between the base assembly and the image sensing module, and wherein the light blocking portion is disposed on a side of the lens and extends in a direction opposite to the lens assembly.

4. The lens adjustment device according to claim 3, wherein the elastic member is disposed between the lens assembly and the light blocking member, and the elastic member includes a first end that abuts against the lens assembly and a second end that abuts against the light blocking member.

5. The lens adjustment device according to claim 4, wherein the elastic member is a circular spring washer, the circular spring washer is disposed to surround the lens of the lens assembly, wherein a first end of the circular spring washer abuts against the image sensing module of the lens assembly, and a second end of the circular spring washer abuts against the main body portion of the light blocking member.

6. The lens adjustment device according to claim 1, further comprising a positioning member, wherein the base assembly includes a loading frame and a displacement guiding plate disposed on the loading frame, wherein the loading frame is disposed between the displacement guiding plate and the lens assembly, and wherein the displacement guiding plate and the lens assembly are disposed on the loading frame via the positioning member, wherein the displacement guiding plate includes a first abutting portion that abuts against the loading frame and a second abutting portion that abuts against the light blocking member, and wherein the light blocking member abuts against a portion between the second abutting portion and the elastic member.

7. The lens adjustment device according to claim 6, wherein the base assembly further includes a supporting frame disposed between the lens assembly and the loading frame, wherein the loading frame is disposed between the displacement guiding plate and the supporting frame, and wherein the displacement guiding plate, the supporting frame and the lens assembly are disposed on the loading frame via the positioning member, wherein the supporting frame includes a third abutting portion that abuts against the light blocking member and a fourth abutting portion that abuts against the loading frame.

8. The lens adjustment device according to claim 6, wherein the displacement guiding plate further includes a guiding groove formed between the first abutting portion and the second abutting portion, wherein when the lens assembly rotates relative to the base assembly, the positioning member is slidable along the guiding groove.

9. The lens adjustment device according to claim 6, wherein the positioning member is disposed on the lens assembly, the displacement guiding plate further includes a limiting portion corresponding to the positioning member, wherein when the lens assembly is rotated to a predetermined position relative to the base assembly, the positioning member abuts against the limiting portion so as to limit rotation of the lens assembly.

10. The lens adjustment device according to claim 6, wherein the loading frame includes a first positioning portion, wherein the displacement guiding plate includes a second positioning portion corresponding to the first positioning portion, wherein the first positioning portion and the second positioning portion is engaged with each other.

11. The lens adjustment device according to claim 1, further comprising an identification mark, wherein the identification mark is marked on the lens assembly so as to identify a position of the lens assembly relative to the base assembly.

12. The lens adjustment device according to claim 1, wherein the lens assembly further includes a first engaging portion, wherein the light blocking member further includes a second engaging portion corresponding to the first engaging portion, wherein when the light blocking member is in the second predetermined position, the first engaging portion and the second engaging portion is engaged with each other.

13. The lens adjustment device according to claim 1, further comprising a positioning member, wherein the base assembly includes a loading frame, wherein the loading frame includes a displacement guiding structure, and the lens assembly is disposed on the loading frame via the positioning member, and wherein the displacement guiding structure includes a first abutting portion and a second abutting portion that abuts against the light blocking member, and wherein the light blocking member abuts against a portion between the second abutting portion and the elastic member.

14. The lens adjustment device according to claim 13, wherein the base assembly further includes a supporting frame disposed between the lens assembly and the loading frame, wherein the supporting frame and the lens assembly are disposed on the loading frame via the positioning member, wherein the supporting frame includes a third abutting portion that abuts against the lens assembly and a fourth abutting portion that abuts against the displacement guiding structure.

15. The lens adjustment device according to claim 13, wherein the displacement guiding structure further includes a guiding groove formed between the first abutting portion and the second abutting portion, wherein when the lens assembly rotates relative to the base assembly, the positioning member is slidable along the guiding groove.

\* \* \* \* \*